June 16, 1931.  W. J. KENELY  1,810,565
FISH LURE AND GRAPPLE
Filed Oct. 13, 1930  2 Sheets-Sheet 1
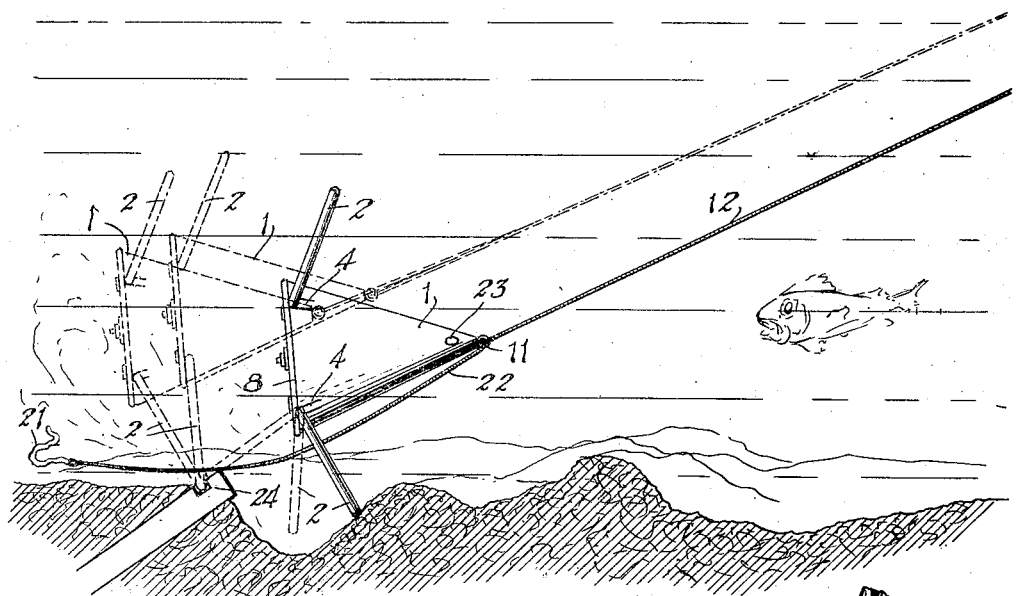
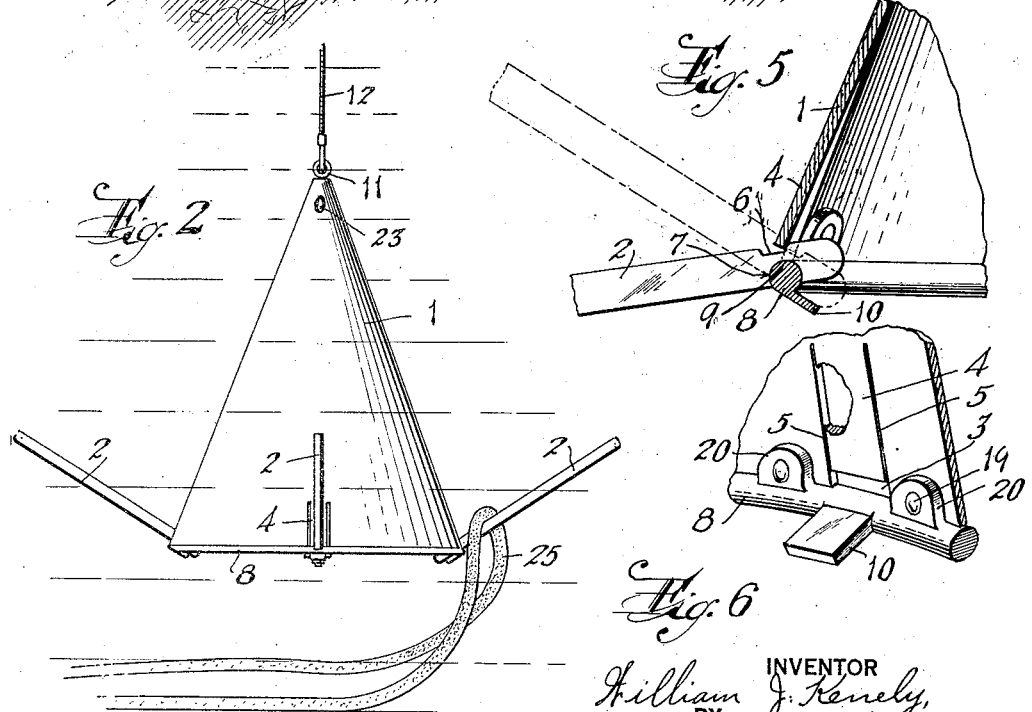
INVENTOR
William J. Kenely,
BY
Everett H. Rook,
ATTORNEYS.

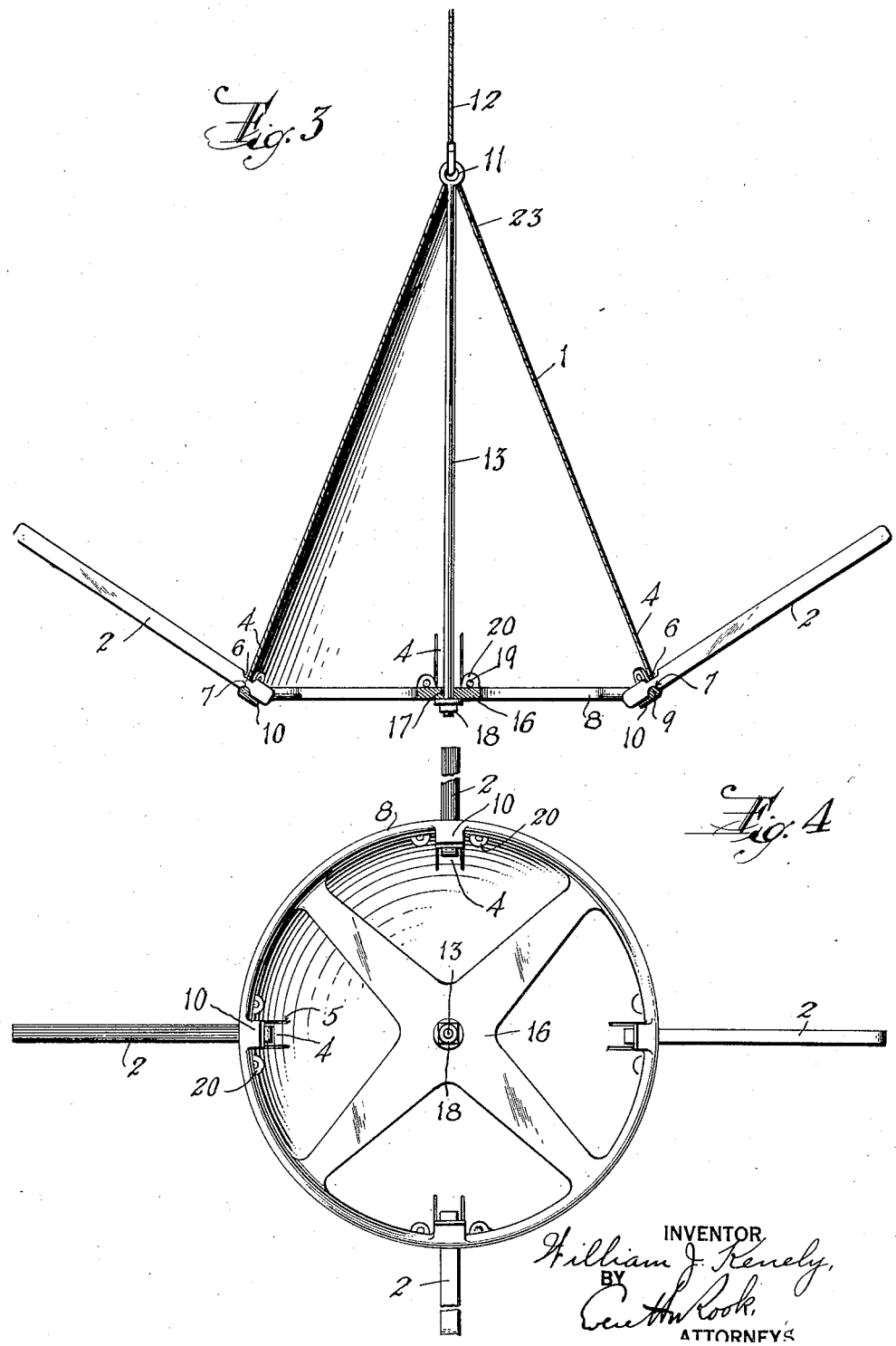

Patented June 16, 1931

1,810,565

UNITED STATES PATENT OFFICE

WILLIAM J. KENELY, OF ELIZABETH, NEW JERSEY

FISH LURE AND GRAPPLE

Application filed October 13, 1920. Serial No. 438,334.

This invention relates in general to a device adapted for use as either a fish lure, grapple or hook according to the desire of the owner.

One object of the invention is to provide such a device which can be attached to a line and has a plurality of radiating arms or flukes resiliently movable in a direction opposite to that of the tension upon the line so as to clear the device of obstructions, such as stones or an object which it is desired to raise with the device, when the line tension reaches a predetermined maximum, and thereby avoid breaking of the line.

Another object of the invention is to provide such a device which can be attached to a fishing line in proximity to the bait and dragged along the bottom of the body of water, so that certain of the flukes will rest on the bottom and stir up the mud or sand to simulate the movement of a creature on the bottom, so as to attract fish which reaching the vicinity of the bestirred mud or sand will see the bait and presumably strike at it.

Further objects are to provide a device of this character including a body and novel and improved means for mounting the arms or flukes thereon; to provide such a device which shall be simple, durable and inexpensive in construction; and to obtain advantages and results as will be brought out by the following description.

Referring to the accompanying drawings in which corresponding and like parts are designated through the several views by the same reference characters, Figure 1 is a side elevation of a fish lure embodying my invention showing the manner of using the same.

Figure 2 is a similar view showing the invention used as a grapple.

Figure 3 is an enlarged vertical longitudinal sectional view through the device.

Figure 4 is a bottom plan view thereof.

Figure 5 is an enlarged fragmentary sectional view through the hinged connection of one of the arms or flukes to the body, and Figure 6 is an enlarged fragmentary perspective view of the parts shown in Figure 5 with the arm or fluke omitted.

Specifically describing the invention, the reference character 1 designates the body of the device which is in the form of a hollow cone and may be constructed of sheet metal. At the large end of the body are mounted a plurality of arms or flukes 2 which radiate from the body and are pivotally connected thereto to move in radial planes. This connection may be of any suitable construction, but preferably the edge of the large end of the body is provided with a plurality of notches 3, one to receive each arm 2 and each notch having at its base a spring tongue 4 which may be formed integral with the body by slitting the body as at 5.

Each of the arms 2 has adjacent one end thereof a notch 6 which receives the end of the corresponding spring tongue 4 and at the edge of the arm opposite the notch 6 is formed another notch 7 preferably arcuate in cross section. The arms are held in position on the body 1 by a clamping ring 8 which has pivotal portions 9 each fitting in the notch 7 of one of the arms 2 whereby said arms may swing about said pivotal portions. The ring 8 may be secured to the body by rivets or bolts 19 passing through eyes 20 on the ring and through the body. Swinging movement of the arms in one direction is limited by lugs 10 on the clamping ring against which the inner ends of the arms abut, as clearly shown in Figures 3 and 5. With this construction, the spring tongues 4 normally engage the notches 6 so as to hold the arms against the stop lugs 10 and projecting from the body at oblique angles to the axis thereof and with the outer ends of the arms extending in the direction of the small end of the body. The outer ends of the arms may be swung in the direction away from the small end of the body against the influence of the spring tongues 4 as shown by solid lines in Figure 5 and by dot and dash lines in Figure 1, into a position substantially parallel with the axis of the body.

At the small end of the body is provided an eye 11 for attachment to a line, and this eye may be formed integral with a bolt 13 extending longitudinally through the body; and the ring 8 may be in the form of a spider having a central portion 16 provided with an opening 17 through which passes the end of the bolt 13. A clamping nut 18 may be secured upon the extremity of the bolt outside the spider, and thereby the bolt 13 serves to reenforce the body against strains on the eye 11.

In use of the device as a fish lure, a bait 21 may be secured by a line 22 to the eye 11, and the device is dragged over the bottom of a body of water by pulling upon the line 12 as shown in Figure 1 of the drawings. Preferably the body has a plurality of openings 23 at its small end to permit the escape of air and facilitate rapid sinking of the device. At least two of the arms 2 bear upon the bottom and stir up sand and mud as the device is dragged. This will attract the attention of nearby fish, which reaching the vicinity of the disturbed sand or mud will see the bait 21 and strike at it. Should the arms strike an obstruction as indicated at 24, further pulling upon the line 12 will cause the arms to swing rearwardly or away from the small end of the body so as to clear the obstruction as shown in Figure 1. It will be understood, of course, that the line must be capable of withstanding a predetermined tension sufficient to overcome the resistance exerted by the spring tongues 4 against swinging of the arms 2. The possibility of breaking of the line and loss of the device is therefore materially reduced.

The device may also be used as a hook or grapple as shown in Figure 2 of the drawings. For lifting a submerged cable, line or other object 25, one or more of the arms 2 are brought into engagement with the cable or the like so that when the body 1 is raised by the line 12, the cable will be elevated. Should the weight of the cable or other object being raised be too great for the line 12, the arms engaged with the cable will swing downwardly as shown in Figure 5, or away from the small end of the body so as to release the arms from the cable.

While I have shown and described the invention as embodied in certain details of construction it should be understood that this is primarily for illustrating the principles of the invention and that many modifications and changes may be made in the details of construction without departing from the spirit or scope of the invention.

Having thus described my invention, what I claim is:

1. A device of the character described comprising a body having means at one end for attachment to a line, and a plurality of arms pivotally mounted on said body to swing in the direction of and opposite to that of the pull upon the line into a position substantially parallel with the axis of said body, and spring means for yieldingly resisting movement of said arms in the direction opposite to that of the pull upon the line.

2. A device of the character described comprising a hollow conical body having means at its small end for attachment to a line, a plurality of arms each having a notch in each of its opposite edges adjacent one end, a ring secured to the other end of said body and engaging the notch in one edge of each arm to pivotally mount said arms between said ring and the end of the body to swing in axial planes thereof, and a spring engaging the other notch of each arm to yieldingly resist swinging of the outer ends of said arms in the direction away from the first-mentioned end of said body.

3. A device of the character described comprising a hollow conical body having means at its small end for attachment to a line and a plurality of recesses at its other end, a plurality of arms one in each of said recesses and each having a notch in each of its opposite edges adjacent one end, a ring secured to the second-mentioned end of said body and engaging the notch in one edge of each arm to pivotally mount said arms between said ring and the end of the body to swing in axial planes thereof, and a spring engaging the other notch of each arm to yieldingly resist swinging of the outer ends of said arms in the direction away from the first-mentioned end of said body.

4. A device of the character described comprising a hollow conical body having an axial opening at its small end, an axial bolt extending through said opening and the body and having an eye at the small end of the body for attachment to a line, a plurality of arms each having a notch in each of its opposite edges adjacent one end, a spider secured to the other end of said body and said bolt and having a ring portion engaging the notch in one edge of each arm to pivotally mount said arms between said ring and the end of the body to swing in axial planes thereof, and a spring engaging the other notch of each arm to yieldingly resist swinging of the outer ends of said arms in the direction away from the first-mentioned end of said body.

WILLIAM J. KENELY.